(12) United States Patent
Blanc

(10) Patent No.: US 10,843,413 B2
(45) Date of Patent: Nov. 24, 2020

(54) METHODS FOR FORMING BONDED STRUCTURES

(71) Applicant: Bell Helicopter Textron Inc., Fort Worth, TX (US)

(72) Inventor: Olivier Blanc, Québec (CA)

(73) Assignee: TEXTRON INNOVATIONS INC., Fort Worth, TX (US)

(*) Notice: Subject to any disclaimer, the term of this patent is extended or adjusted under 35 U.S.C. 154(b) by 129 days.

(21) Appl. No.: 15/935,789

(22) Filed: Mar. 26, 2018

(65) Prior Publication Data
US 2019/0291355 A1 Sep. 26, 2019

(51) Int. Cl.
*B29C 65/48* (2006.01)
*C09J 7/38* (2018.01)
(Continued)

(52) U.S. Cl.
CPC .......... *B29C 65/4845* (2013.01); *B29C 65/10* (2013.01); *B29C 65/4835* (2013.01); *B29C 65/5057* (2013.01); *B29C 66/0012* (2013.01); *B29C 66/00145* (2013.01); *B29C 66/1122* (2013.01); *B29C 66/45* (2013.01); *B29C 66/532* (2013.01); *B29C 66/721* (2013.01); *B29C 66/73756* (2013.01); *B29C 66/81455* (2013.01); *B29C 70/342* (2013.01); *C09J 5/04* (2013.01); *C09J 7/38* (2018.01); *B29C 65/1406* (2013.01); *B29C 66/524* (2013.01); *B29C 66/71* (2013.01); *B29C 66/7212* (2013.01); *B29C 66/73752* (2013.01); *B29L 2031/3076* (2013.01); *B29L 2031/3082* (2013.01);
(Continued)

(58) Field of Classification Search
CPC .. C09J 5/04; C09J 7/38; B29C 70/342; B29C 66/0012; B29C 65/4845
See application file for complete search history.

(56) References Cited

U.S. PATENT DOCUMENTS 4,783,362 A * 11/1988 Thornton ................ B29C 35/08
428/408
6,692,681 B1 * 2/2004 Lunde ..................... B29C 43/12
156/173
(Continued)

FOREIGN PATENT DOCUMENTS

| DE | 4023713 A1 | 1/1992 |
|---|---|---|
| EP | 2843020 A1 | 3/2015 |
| EP | 3546200 B1 | 6/2020 |

OTHER PUBLICATIONS

EPO Examination Report issue in EP Patent Application No. 181791872 dated Dec. 20, 2018, 6 pages.
(Continued)

*Primary Examiner* — Daniel McNally
(74) *Attorney, Agent, or Firm* — Patent Capital Group

(57) ABSTRACT

A method is provided in one example embodiment and may include assembling a first component and a second component together using, at least in part, a first adhesive film on the first component and a second adhesive film on the second component, wherein the first component and the second component are fully cured and the first adhesive film and the second adhesive film are at least partially uncured; and curing the first adhesive film and the second adhesive film to form a bonded structure.

17 Claims, 8 Drawing Sheets

(51) Int. Cl.
 *B29C 65/00* (2006.01)
 *B29C 70/34* (2006.01)
 *C09J 5/04* (2006.01)
 *B29C 65/10* (2006.01)
 *B29C 65/50* (2006.01)
 B29L 31/30 (2006.01)
 B29C 65/14 (2006.01)
(52) U.S. Cl.
 CPC . *B29L 2031/3088* (2013.01); *C09J 2301/416* (2020.08); *C09J 2463/00* (2013.01)

(56) References Cited

U.S. PATENT DOCUMENTS

| | | | |
|---|---|---|---|
| 2006/0191624 A1* | 8/2006 | Whitworth | B29C 65/18 156/94 |
| 2011/0192535 A1* | 8/2011 | Turner | B29C 43/28 156/266 |
| 2012/0082851 A1* | 4/2012 | Zaldivar | B32B 27/08 428/409 |
| 2016/0121591 A1* | 5/2016 | MacAdams | B32B 37/144 156/307.3 |
| 2017/0368812 A1 | 12/2017 | Palmieri et al. | |

OTHER PUBLICATIONS

EPO Search Report issue in EP Patent Application No. 18179187.2 dated Dec. 7, 2018, 4 pages.
EPO Examination Report issue in EP Patent Application No. 18179187.2 dated Jun. 12, 2019, 4 pages.

* cited by examiner

METHODS FOR FORMING BONDED STRUCTURES

TECHNICAL FIELD

This disclosure relates in general to the field of aircraft and, more particularly, though not exclusively, to methods for forming bonded structures.

BACKGROUND

Aircraft can include many components that can be constructed from materials bonded together into bonded structures. Bonded structures are typically used to achieve certain structural properties and/or designs. Bonded structures are often inspected to validate the strength of the bond between materials. Current methods for validating bond strength, however, typically involve applying a load to the bond, which can be difficult depending on the design and/or geometry of a bonded structure and/or can damage the bonded structure. Thus, it may be challenging to manufacture aircraft components using bonded structures having validated bond strengths.

SUMMARY

According to one aspect of the present disclosure, a method may be provided and may include assembling a first component and a second component together using, at least in part, a first adhesive film on the first component and a second adhesive film on the second component, wherein the first component and the second component are fully cured and the first adhesive film and the second adhesive film are at least partially uncured; and curing the first adhesive film and the second adhesive film to form a bonded structure.

The method can include, prior to the assembling, affixing a first surface of the first adhesive film to the first component at a bond location for the first component, wherein the first adhesive film comprises a backing film that covers a second surface of the first adhesive film; and curing the first component using a first cure cycle. The method can further include, prior to the assembling, affixing a first surface of the second adhesive film to the second component at bond location for the second component, wherein the second adhesive film comprises a backing film that covers a second surface of the second adhesive film; and curing the second component using a second cure cycle. The method can further include, prior to the assembling, removing the backing film of the first adhesive film and the backing film of the second adhesive film. The method can further include, prior to the assembling, providing at least one other adhesive film between the first adhesive film of the first component and the second adhesive film of the second component.

For the method, at least one of: the first adhesive film and the second adhesive film can be cured at a temperature that is higher than temperatures at which the first component and the second component are cured; the first adhesive film and the second adhesive film can be cured over a period of time that is longer than the periods of time over which the first component and the second component are cured; and the first adhesive film and the second adhesive film can be cured using ultraviolet light. Curing the first adhesive film and the second adhesive film can include applying a pressure to the assembled first and second components. The method can be performed in a clean room environment. In some cases, the first adhesive film and the second adhesive film can be composed of a material that includes epoxy or bismaleimide.

In some cases, material of the first adhesive film and the second adhesive film may be different than a material of at least one of the first component and the second component. In some cases, the material of the first adhesive film and the second adhesive film can be the same as a material of at least one of the first component and the second component. In some cases, the first component can be at least one of a plurality of first components and/or the second component can be at least one of a plurality of second components.

According to another aspect of the present disclosure, another method may be provided and may include assembling a first ply stack, wherein the first ply stack comprises a plurality of first plies and a first adhesive film, and the first adhesive film comprises a backing film on one surface; curing the first ply stack using a first cure cycle to form a first component; assembling a second ply stack, wherein the second ply stack comprises a plurality of second plies and a second adhesive film, and the second adhesive film comprises a backing film on one surface; curing the second ply stack using a second cure cycle to form a second component; removing the backing film of the first adhesive film and the backing film of the second adhesive film; assembling the first component and the second component using, at least in part, the first adhesive film and the second adhesive film; and curing the first adhesive film and the second adhesive film using a third cure cycle to form a bonded structure. In some cases, the method can include, prior to the assembling, providing at least one other adhesive film between the first adhesive film of the first component and the second adhesive film of the second component.

The third cure cycle can include at least one of: a temperature that is higher than a first temperature used in the first cure cycle and a second temperature used in the second cure cycle; a period of time that is longer than a first period of time used in the first cure cycle and a second period of time used in the second cure cycle; and an ultraviolet light applied to the assembled first and second components. The third cure cycle can further include applying a pressure to the assembled first and second components. The method can be performed in a clean room environment.

The first adhesive film and the second adhesive film can be composed of a material that includes epoxy or bismaleimide. In some cases, the material of the first adhesive film and the second adhesive film can be different than a material of at least one of the first component and the second component. In still some cases, the material of the first adhesive film and the second adhesive film can be the same as a material of at least one of the first component and the second component.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
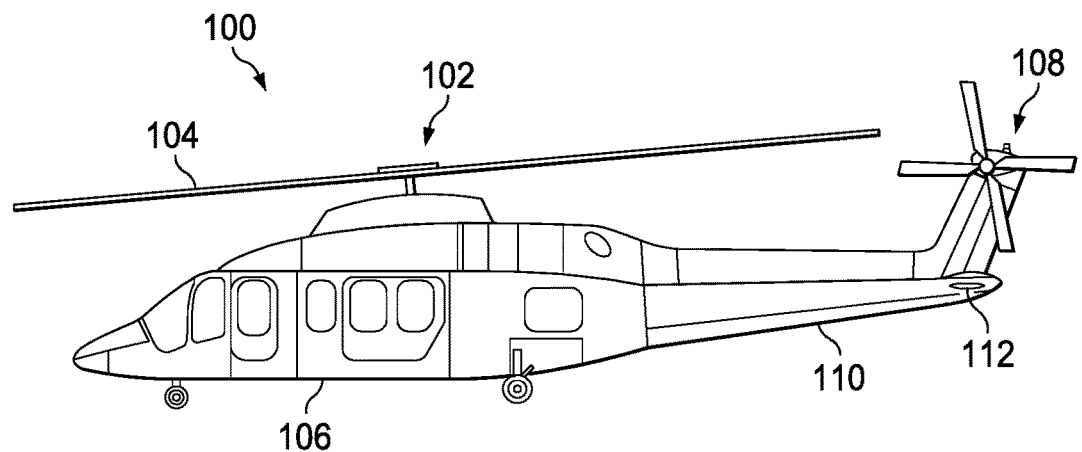
FIGS. 1A-1B are simplified schematic diagrams of an example rotorcraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions and/or other characteristics (e.g., time, pressure, temperature, distance, etc.) of an element, operations, conditions, etc. the phrase 'between X and Y' represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
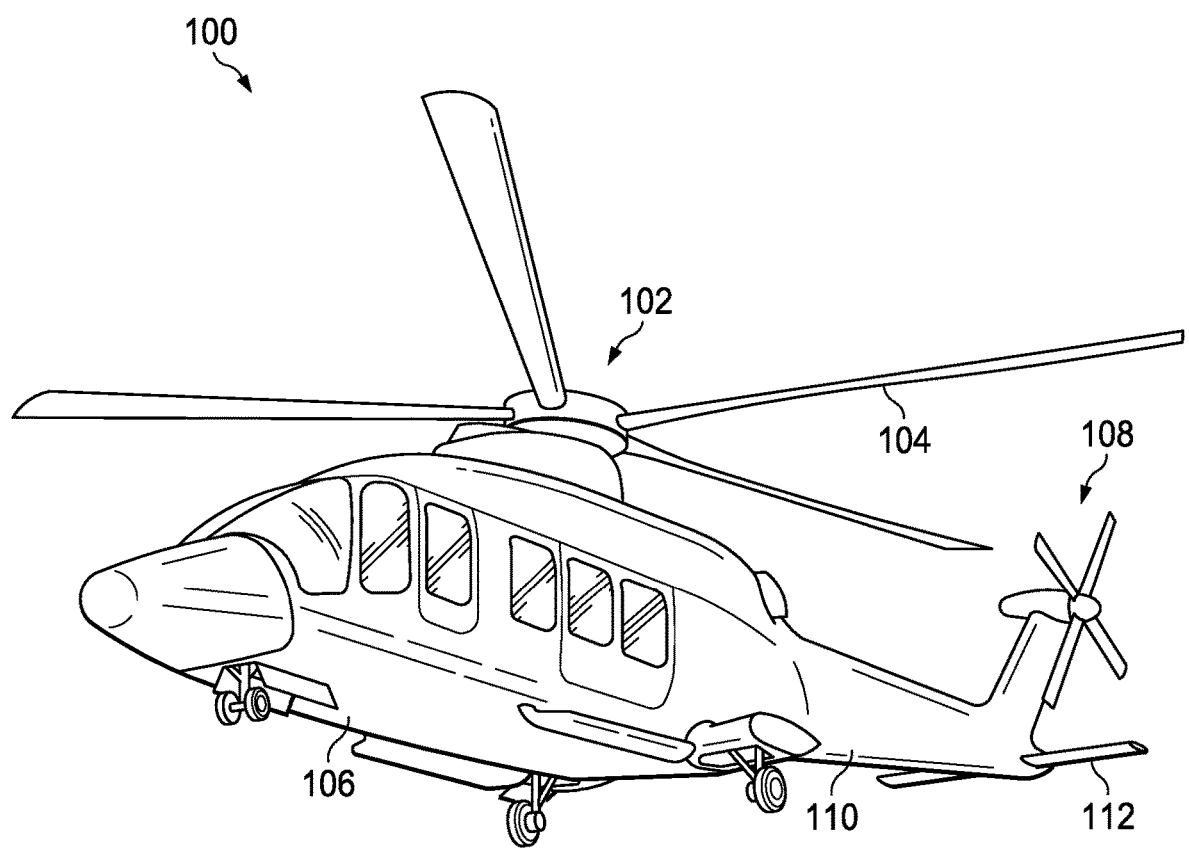

FIGS. 1A-1B illustrate an example embodiment an example aircraft, which in this example is a rotorcraft 100. FIG. 1A portrays a side view of the rotorcraft 100, while FIG. 1B portrays an isometric view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, a tail rotor or anti-torque system 108, an empennage 110, and a tail structure 112. The fuselage 106 is the main body of the rotorcraft, which may include a cabin (e.g., for crew, passengers, and/or cargo) and/or may house certain mechanical and electrical components (e.g., engine(s), transmission, and/or flight controls). In the illustrated embodiment, tail structure 112 may be used as a horizontal stabilizer. Torque is supplied to rotor system 102 and anti-torque system 108 using at least one engine and at least one gearbox.

In some cases, certain components of rotorcraft 100 may be made from composite materials. A composite material is a combination of different materials integrated together (e.g., cured) to achieve certain structural and/or design properties. Stated differently, a composite material may be a combination of at least two different materials that, when they are in close proximity and function in combination with each other, enhance the capabilities that either material may possess alone. Composite materials can be integrated together to form three-dimensional composite structures. The properties of a three-dimensional composite structure are typically superior to the properties of the underlying materials individually. For example, certain composite materials may be lightweight yet relatively strong, rendering them particularly suitable for aircraft and other applications where weight and/or strength are critical to performance.

Composite components, also referred to herein interchangeably as composite parts, may include multiple layers of composite materials. Layers of composite materials used in forming a composite component are often referred to as plies or laminates, which can be configured (e.g., by hand or using a placement machine) into a ply or laminate stack and further processed to form the composite component.

In some cases, composite materials that may be used in forming composite parts in accordance with embodiments described herein can be fiber reinforced composite parts. In general, a fiber reinforced composite material may be any composite that includes a fiber that is a basic load carrying member of a composite and a matrix (e.g., a resin, adhesive, etc.) that holds the composite together so that energy can be transferred among the fibers for the composite. Fibers for reinforced composite materials can include woven fabrics, unidirectional fibers, multidirectional fibers, and/or any combination thereof, which may or may not be implemented as one or more sheets of fibers for a composite material. In some instances, fibers for a reinforced composite material can be referred to as a 'fiber system'. Examples of various fibers or fiber systems that may be included in a composite material that may be used in forming composite structures in accordance with embodiments described herein can include but not be limited to, carbon, boron, Kevlar®, glass (e.g., fiberglass), basalt, Dyneema®, metals (coated or uncoated), metal alloys (coated or uncoated), metal coated fibers, combinations thereof, or the like.

A fiber system for a composite material can be disposed in an uncured resin or adhesive system, which may be in the form of a pre-impregnated (typically referred to using the term 'prepreg') composite material. Examples of a resin or adhesive system that may be included in a composite material that may be used in forming bonded structures in accordance with embodiments described herein can include, but not be limited to, a thermoset system such as polyester, plastic (e.g., bismaleimide (BMI) plastic), and/or an epoxy material; or a thermoplastic system (e.g., polyetheretherketone (PEEK), Polyetherkeytonekeytone (PEKK), Polyetherimide (PEI), etc.), or the like. One example adhesive system that may be included in a composite material that may be used in forming bonded structures in accordance with embodiments described herein can include, but not be limited to, AF163 made by 3M®.

Various fiber reinforced composite materials that may be used in forming bonded structures in accordance with embodiments described herein may include carbon fiber reinforced polymer (CFRP), HexPly 8552 made by Hexcel®, carbon fiber fabric prepreg plies (e.g., 3K carbon fiber fabric with either a Hexcel® F593, Ciba Geigy R922, Ciba Geigy R6376, Ciba Geigy M20, or thermoplastic system), boron fiber prepreg plies, fiberglass prepreg plies, or the like.

Uncured prepreg plies typically have air entrained in them. When forming composite components, multiple layers of prepreg plies are often assembled into a configuration (e.g., via a molding tool or the like) and the air is removed to 'debulk' and compact the plies. Traditionally, debulking of uncured prepreg plies can be performed using externally-applied mechanical pressure and human effort. Typically, vacuum systems or hydraulic equipment can be used to debulk uncured prepreg plies. In some cases, heat may be used during a 'hot debulk' or 'hot compaction' processing cycle (or cycles) to remove additional bulk from the plies that may not be removed by mechanical pressure alone and/or to ensure a proper fit in a molding tool. The heat can decrease viscosity of the resin or adhesive system of a prepreg ply, which allows the resin to flow better and allow volatiles (e.g., any trapped gasses) to escape. Removing such volatiles can help to reduce defects such as voids, wrinkles (sometimes referred to as 'marcels'), and/or porosity for cured composite components. Such defects can decrease the strength of a composite component. Heat is typically applied using an oven or autoclave.

In some cases, multiple hot compactions, which can include assembly and compaction of multiple ply stacks, may be used during composite component fabrication. Once hot compactions are completed, one or more cure cycles may be performed to cure the resin or adhesive system of the composite component. In general, a cure cycle can include heating a composite component to an elevated temperature (e.g., greater than room temperature) for a period of time. In some cases, a cure cycle can be performed to cause the resin or adhesive system of a composite component to experience a phase change and/or a chemical change (e.g., polymerization). As referring to herein in this Specification, the terms 'cure cycle', 'cure process', and variations thereof, may be used interchangeably.

In some cases, certain components of rotorcraft 100 may be assembled from at least two components or parts, such as for example, parts made from composite materials, bonded together to form a bonded structure. Bonded assemblies may be fabricated to increase the strength of at least one of the components. For example, a flight control surface (sometimes referred to as a 'skin') may have support members or 'stringers' bonded to one side to increase strength of the flight control surface to resist deformation or damage.

Many components of rotorcraft and/or other aircraft can be designed using bonded structures including, but not limited to, flight control surfaces, wings, fairings, cowlings, spoilers, stabilizers, propellers, rotor blades, rotor yokes, engine blades, engine components, airframe structural components, the fuselage, various interior components (e.g., floors, walls, fixtures), and so forth. As referred to herein in this Specification, the terms 'bonded structure', 'bonded assembly', variations thereof, or the like may include any part, element, component, device, etc. that may be formed (e.g., manufactured, fabricated, etc.) using at least two components or parts bonded together. Typically, components are bonded together at a bond location (sometimes referred to as a 'bond line') to form a bonded joint between the components. As referred to herein, the terms 'forming', 'fabricating', 'manufacturing', variations thereof, or the like may be used interchangeably in reference to making a bonded structure.

Adhesive bonding of composite components is a widely used method of forming bonded structures; however, methods for inspecting and validating the strength of the bond for bonded structures are limited. Currently, the only available method to validate the strength of a bonded joint is to test it by applying some kind of loading (e.g., a proof load), but this is not desirable for many reasons, especially for complex geometries. For example, applying a proof load to a bonded structure can damage the structure. Current non-destructive inspection (NDI) methods can only detect delaminations, voids, and/or whether foreign materials are in the bond line. The so-called 'kissing bond' cannot be detected. The 'kissing bond' is a condition where there are no voids in the bond line, but where one or both faying surfaces (e.g., surfaces in contact at a joint) were contaminated prior to bonding by a material (e.g., grease, dust, release agents, silicones, moisture, etc.) that prevents proper adhesion between the surfaces.

This has led to non-certifiable bonded joints being used in aircraft bonded structures unless the bond is 'cocured', which means that the bond is cured simultaneously with the parent composite material(s) of composite components that are to be bonded together. Cocured bonded structures virtually eliminate any chances of contamination within a bonded joint.

Secondary bonded joints between aircraft primary structural parts in which at least one part in fully cured prior to bonding are currently difficult to certify. To palliate this, designers have relied heavily on fastened joints (e.g., using fasteners such as rivets, screws, etc.) which are easily certifiable, but are both expensive and heavy compared to bonded joints. In general, a joint between bonded components can be considered a 'certified' or 'certifiable' joint if it is formed using a controlled bonding process that has been certified (e.g., by a certification organization, body, person, etc.) as capable of producing a bonded joint that has a validated strength, properties, etc. A certified bonding process is typically performed in a clean room environment that has been qualified as meeting certain requirements (e.g., requirements regarding temperature, humidity, dust particles, protective clothing, etc. and/or material restrictions such as no silicones, etc.) that may limit potential contamination of materials within a bonded joint.

The present disclosure describes various embodiments for providing a certifiable structural adhesive bonding method for forming bonded structures, which may be used for aircraft primary structures. In at least one embodiment, a method for forming a bonded structure can include assembling a first component and a second component together using, at least in part, a first adhesive film material that is affixed along a bonding line of the first component and a second adhesive film material that is affixed along a bonding line of the second component. As referred to herein in this Specification, the terms 'adhesive film material' and 'adhesive film' may be used interchangeably. The first and second components may be cured prior to the assembling, while the first and second adhesive films may be at least partially uncured or fully uncured during the assembling. A partially cured adhesive is sometimes referred to as a 'B-staged' adhesive. Once assembled, the method can include curing the first adhesive film and the second adhesive film to form the bonded structure. The method may be performed in a clean room environment. Other details related to providing a certifiable structural adhesive bonding method for forming bonded structures are described herein, below Embodiments described throughout this disclosure may provide numerous technical advantages including, but not limited to, providing a complete certifiable bonding system for forming bonded structures that may not use fasteners, thereby providing various advantages over fastened joints; and/or may not require surface preparation prior to bonding components together. Various advantages for bonded structures having certified bonded joints can include, but not be limited to, being cheaper, lighter, more aerodynamic, having better aesthetics, combinations thereof, and/or the like in comparison to structures formed using fastened joints.

Example embodiments associated with forming bonded structures using adhesive films are described below with more particular reference to the remaining FIGURES. It should be appreciated that rotorcraft 100 of FIGS. 1A-1B is merely illustrative of a variety of aircraft in which bonded structures may be used in accordance embodiments of the present disclosure. Other aircraft in which bonded structures may be used can include, for example, fixed wing airplanes, hybrid aircraft, unmanned aircraft, gyrocopters, a variety of helicopter configurations, any Federal Aviation Regulations (FAR) certified non-military flying machines, and/or drones, among other examples. Moreover, it should be appreciated that even though bonded structures may be used in aircraft, composite structures as discussed for various embodiments described herein may also be used in a variety of industries including, but not limited to, aerospace, non-aircraft transportation (e.g., boats, automobiles, busses, etc.), railway transportation, consumer electronics, sporting equipment, or the like.

Figure 2A:
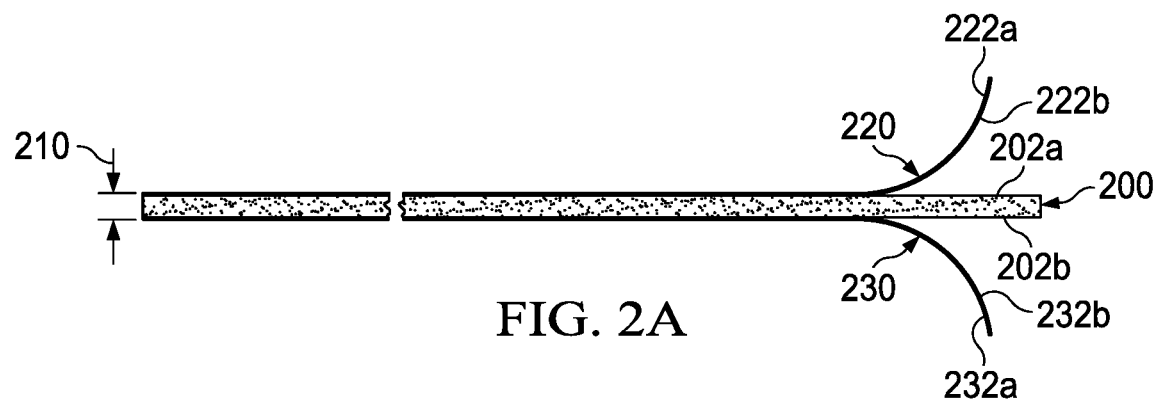
FIGS. 2A-2B are simplified diagrams illustrating example details associated with an example adhesive film that may be used for forming bonded structures, in accordance with certain embodiments.
Figure 2B:
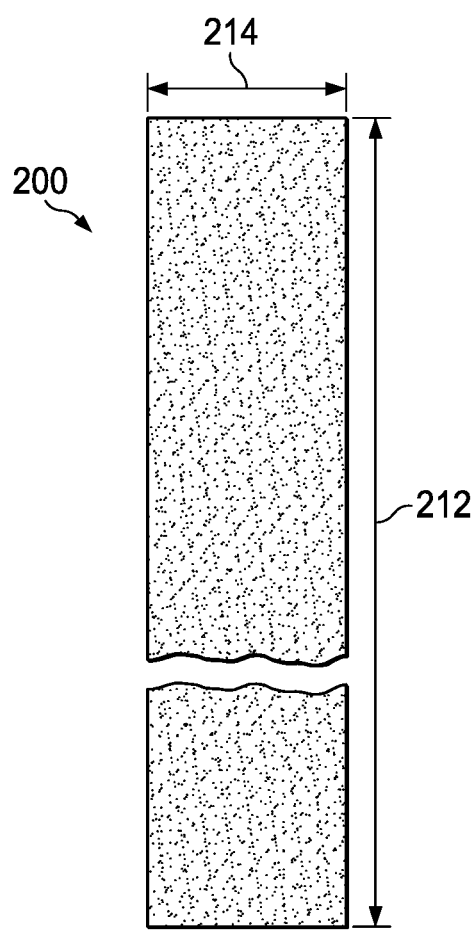

Referring to FIGS. 2A-2B, FIGS. 2A-2B are simplified diagrams illustrating example details associated with an example adhesive film 200 that may be used for forming bonded structures, in accordance with certain embodiments. Referring to FIG. 2A, FIG. 2A is a simplified side view diagram illustrating example details associated with adhesive film 200, in accordance with certain embodiments. Referring to FIG. 2B, FIG. 2B is a simplified top view diagram illustrating other example details associated with adhesive film 200, in accordance with certain embodiments.

As illustrated in FIG. 2A, adhesive film 200 may have a first adhesive surface 202a and a second adhesive surface 202b. The adhesive film 200 may be composed of a material such that the first and second adhesive surfaces 202a, 202b of the adhesive film 200 may have a tackiness that may facilitate affixing the adhesive film 200 to the bonding surface of another material (e.g., affixed to a surface of a component and/or ply of a component being formed that is to be bonded to another component and/or affixed to another adhesive film) and/or to another adhesive film. The adhesive film 200 may be flexible to facilitate adherence of the film to varying contours of a component to which it is affixed. In various embodiments, adhesive film 200 may be composed of an epoxy material, BMI, or the like. In at least one embodiment, an adhesive film (e.g., adhesive film 200) to be used in bonding components together may be chemically compatible with the resin or adhesive system of the composite material(s) to which the adhesive film is to be applied.

A first releasable backing layer or film 220 may be secured along the first adhesive surface 202a of the adhesive film 200 and a second releasable backing layer or film 230 may be secured along the second adhesive surface 202b of the adhesive film 200. The first backing film 220 may have an exposed surface 222a and a non-exposed surface 222b. The non-exposed surface 222b of the first backing film 220 may be in contact with the first adhesive surface 202a of the adhesive film 200. The second backing film 230 may have an exposed surface 232a and a non-exposed surface 232b. The non-exposed surface 232b of the second backing film 230 may be in contact with the second adhesive surface 202b of the adhesive film 200.

The first and second backing films 220, 230, respectively, may be provided for the adhesive film 200 to cover and protect the first and second adhesive surfaces 202a, 202b, respectively, from potential contamination (e.g., grease, dust, release agents, silicones, moisture, etc.) prior to the adhesive film 200 being affixed to a component and/or for bonding components together. It is to be understood that the ends of the first and second backing films 220, 230, respectively, are illustrated in FIG. 2A as pulled away from the first and second adhesive surfaces 202a, 202b, respectively, in order to illustrate various features of the backing films; however, the backing films would remain in place covering and protecting the surfaces of the adhesive film when the film is not in use (e.g., not adhered to a component or another adhesive film) such as when the film is in storage, etc. The first and second backing films 220, 230 may be composed of a material or materials (e.g., wax coated paper, polyester film, nylon, Tedlar®, Teflon®, etc.) that may allow the backing films 220, 230 to be removed from the adhesive film 200 prior to affixing the film to a component, another adhesive film, etc. and that may resist (e.g., not be degraded) during the cure cycle of a component. The adhesive film 200 may have a thickness 210. In various embodiments, the thickness 210 of the adhesive film 200 may range between 0.0050 inches and 0.025 inches; however, other thicknesses may be envisioned depending on implementation and/or application.

As illustrated in FIG. 2B, adhesive film 200 may have a length 212 and a width 214. First and second backing films 220, 230 are not illustrated in FIG. 2B for sake of brevity. In various embodiments, the length 212 and width 214 of adhesive film 200 may be varied depending on bond line geometries, component geometries, implementation, application, combinations thereof, or the like. Although adhesive film 200 is illustrated as having a rectangular shape, it is to be understood that an adhesive film used in forming bonded structures in accordance with embodiments described herein may have any shape (e.g., polygonal, circular, etc.) depending on bond line geometries, component geometries, implementation, application, combinations thereof, or the like. Further, it is to be understood that a bond line may have any geometry and may include a continuous or non-continuous bond location or locations along which at least two components may be bonded together.

As discussed in further detail herein, an adhesive film (e.g., adhesive film 200) that may be used in forming bonded structures in accordance with embodiments described herein may have a cure cycle that is different than the cure cycle of the component to which the film is affixed.

Figure 3:
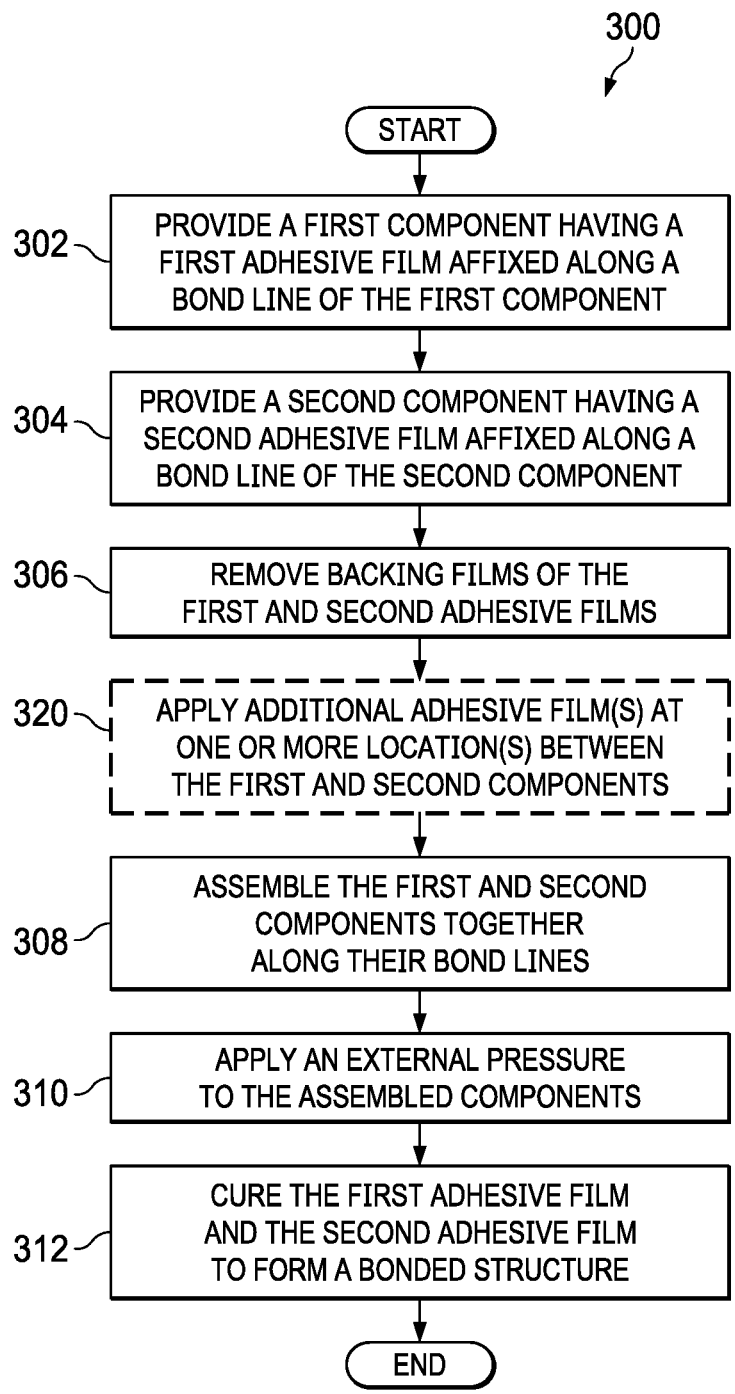
FIG. 3 is a simplified flowchart illustrating example details associated with forming a bonded structure, in accordance with certain embodiments.

Referring to FIG. 3, FIG. 3 is a simplified flowchart 300 illustrating example details associated with forming a bonded structure, in accordance with certain embodiments. The bonded structure may be formed in a clean room environment, which may provide for the bonded structure to have certifiable bonded joint(s) in accordance with embodiments described herein. In at least one embodiment, the flowchart may begin at block 302 by providing a first component having a first adhesive film (e.g., adhesive film 200) affixed (in the clean room environment) along a bond line of the first component. The first component may be fully cured while the first adhesive film may be at least partially uncured or fully uncured. The flowchart may proceed to block 304 by providing a second component having a second adhesive film (e.g., another adhesive film 200) affixed (in the clean room environment) along a bond line of the second component. The second component may be fully cured while the second adhesive film may be at least partially uncured or fully uncured.

The flowchart may proceed to block 306 by removing (in the clean room environment) the backing film from the first adhesive film of the first component and removing the backing film from the second adhesive film of the second component. The flowchart may proceed to block 308 by assembling the first component and the second component together (in the clean room environment) along the bond lines for the first and second component using the first adhesive film and the second adhesive film. For example, the first component and the second component may be mated together along their bond lines using the adhesive films of each component. In some embodiments, prior to assembling (308) the first and the second component together, the flowchart may proceed to block 320 by applying additional adhesive film(s) at one or more locations of the bond line between the first and second components. For example, in some cases, additional adhesive films may be used to fill in gaps, variations, and/or other anomalies that may be present along the bond line for the bonding surfaces of the first component and the second component.

The flowchart may proceed to 310 by applying an external pressure to the assembled first and second components. In some embodiments, the external pressure can be applied using a vacuum system that includes a sealing bag that encapsulates the assembled components to form a sealed volume and a pump that places the sealed volume under an increased vacuum level (e.g., between 1 inch and 28 inches of mercury, etc.). Increasing the vacuum level within the bag decreases pressure within the bag; thereby creating a subsequent increase in pressure on the assembled components within the bag. In still some embodiments, the external pressure can be applied using a mechanical press (e.g., using a hydraulic press, hand tooling, etc.). In still some embodiments, the external pressure can be applied using an autoclave. Other means and methods to apply external pressure to the assembled first and second components can be envisioned and, thus, are clearly within the scope of the present disclosure.

The flowchart may proceed to 312 by curing the first adhesive film and the second adhesive film to form the bonded structure. The curing (312) may be performed using a cure cycle that is different than the cure cycle used to cure the first component and is different than the cure cycle used to cure the second component. In some embodiments, the cure cycle used to cure the first adhesive film and the second adhesive film may include curing the films at a temperature and/or period of time that is different than the cure cycles of the first and second components. For example, in at least one embodiment, the temperature at which the first and the second adhesive films may be cured may be greater than the temperature at which each of the first component and the second component were previously cured. Consider an example in which the first component is cured at a temperature of 140 degrees Fahrenheit and the second component is cured at a temperature of 150 degrees Fahrenheit. In this example, the first and second adhesive films may be made of a material or materials that may use a cure cycle in which the first and second adhesive films are cured at a temperature greater than 150 degrees Fahrenheit.

In another embodiment, the period of time at which the first and second adhesive films may be cured may be longer than the periods of time for which each of the first component and the second component were previously cured. Consider an example in which the first component is cured over an 8 hour period of time and the second component is cured over a 6 hour period of time. In this example, the first and second adhesive films may be made of a material or materials that may use a cure cycle in which the first and second adhesive films are cured over a 10 hour period of time. Thus, for this example, the first and second components may be assembled together and the first and second adhesive films cured within a 2-4 hour window following the curing of the first and second components.

In still another embodiment, the first and second adhesive films may be cured using ultraviolet (UV) light. In still other embodiments, the first and second adhesive films may be made of a material or materials that may have a cure cycle that uses any combination of temperature, time, and/or UV light that may be different than the cure cycles of each of the first and second components. The example cure cycles that may be used to cure adhesive films as discussed herein are provided for illustrative purpose only and are not meant to limit the broad scope of the present disclosure. It is to be understood that virtually any cure cycles may be envisioned and, thus, are clearly within the scope of the present disclosure.

Following the curing (312) the flowchart may be complete. The bonded structure may include certifiable bond joint(s) in accordance with embodiments discussed herein.

Referring to FIGS. 4A-4I, FIGS. 4A-4I are simplified schematic diagrams illustrating example details that may be associated with forming a bonded structure 490 (FIG. 4I), in accordance with certain embodiments. In particular, FIGS. 4A-4E illustrate example details that may be associated with forming a first composite component 408 including a first adhesive film 404 configured along a bond line for the first composite component 408 and FIGS. 4F-4I illustrate example details that may be associated with bonding the first composite component 408 to a second composite component 458 having a second adhesive film 454 configured along a bond line for the second composite component 458.

Figure 4A:
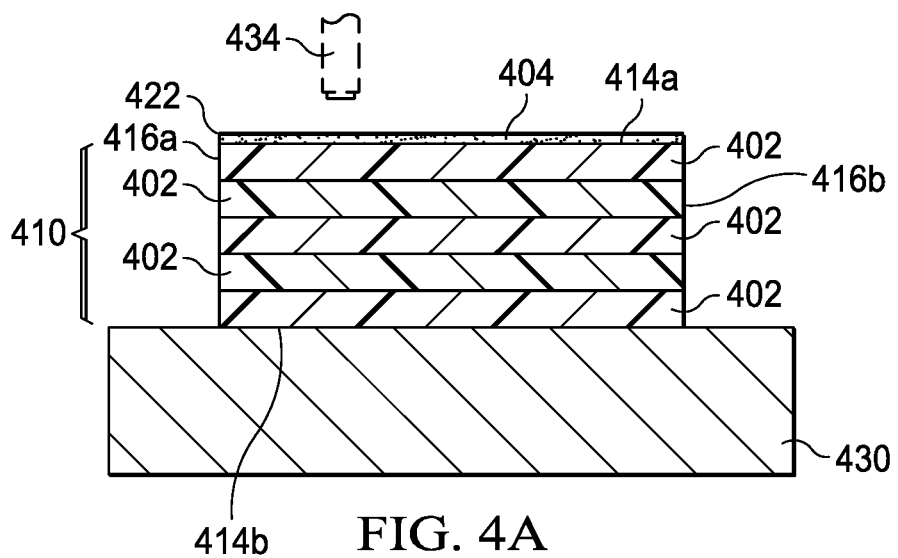
FIGS. 4A-4I are simplified schematic diagrams illustrating example details that may be associated with forming a bonded structure, in accordance with certain embodiments.

Referring to FIG. 4A, a ply stack 410 including multiple uncured composite plies 402 (e.g., uncured carbon epoxy plies) may be assembled (e.g., by a human or by a placement machine 434) on a tool 430. In various embodiments, the tool 430 may be a male mandrel or other molding tool. The ply stack 410 may also have an outer (top) surface 414a, an inner (bottom) surface 414b, and a number of sides 416a, 416b. It is to be understood that the ply stack 410 can include other sides, which are not labeled in FIG. 4A for sake of brevity. A first adhesive film 404 may be applied to the ply stack 410 (e.g., by a human or by a placement machine) along the intended bond line for the first composite component 408 that is to be formed from the ply stack 410. For the embodiments of FIGS. 4A-4I, the bond line for the first composite component 408 may be along at least a portion of the top surface 414a of the ply stack 410. The first adhesive film 404 may have a first backing film 422 covering the adhesive surface of the first adhesive film 404 that is not in contact with the top surface 414a of the ply stack 410. The second backing film (not shown) of the first adhesive film 404 would have been removed from the first adhesive film 404 prior to applying the first adhesive film 404 to the ply stack 410 in a clean room environment. The first backing film 422 may have an exposed surface (not labeled), as discussed herein. The first backing film 422 may protect the first adhesive film 404 from foreign material contamination. Some of the elements illustrated in FIG. 4A are included in other ones of the accompanying FIGURES; the discussion of some of these elements is not repeated when discussing these FIGURES and any of these elements may take any of the forms disclosed herein.

The example ply stack 410 and tool 430 shapes and configurations as well as the number of composite plies 402 illustrated for FIG. 4A are provided for illustrative purpose and are not meant to limit the broad scope of the present disclosure. It is to be understood that virtually any shape and configuration of a ply stack and/or tool on which the ply stack is formed and/or the number of plies in the ply stack may be envisioned and, thus, are clearly within the scope of the present disclosure.

Figure 4B:
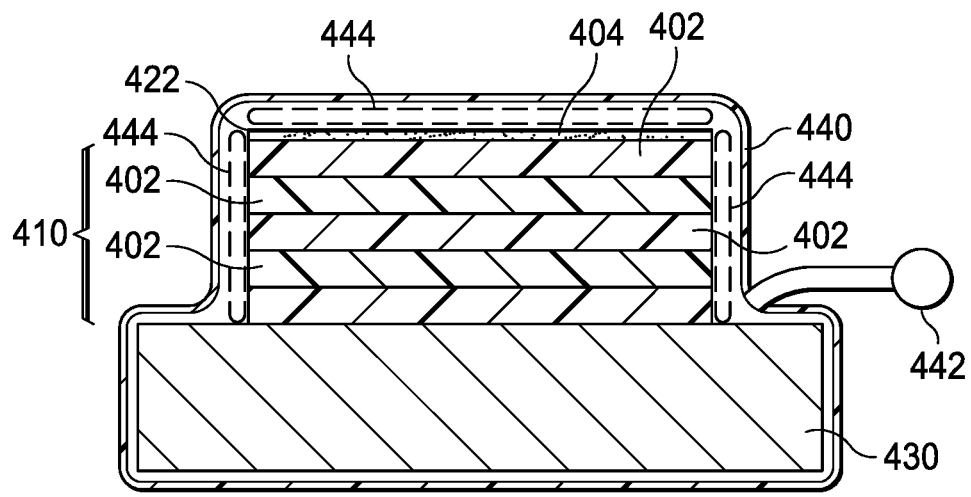

A pressure and heat may be applied to the ply stack 410 to debulk and compact the ply stack 410 in order to form the first composite component 408. In at least one embodiment, a vacuum system including a sealing bag 440 and vacuum device 442, as shown in FIG. 4B, may be used to debulk and compact the ply stack 410; however, it is to be understood that any means or methods (e.g., mechanical press, hand tooling, autoclave, etc.) may be used to debulk and compact a ply stack using one or more compactions. The ply stack 410 and tool 430 may be encapsulated in the sealing bag 440. The sealing bag 440 may be coupled to a vacuum device 442 via a hose coupled to a port (not shown) of the sealing bag 440 or other appropriate means. The sealing bag 440 may provide a sealed volume including the ply stack 410 in which a vacuum can be drawn on the ply stack 410 using the vacuum device 442. In some embodiments, the sealing bag 440 may fully encapsulate the tool 430; however, in other embodiments, the sealing bag 440 may only partially cover the tool 430, in which embodiments the sealing bag 440 may be secured to the tool 430 using sealing tape (not shown) or the like.

At least one foreign material layer(s) 444 may be placed between the sealing bag 440 and the first backing layer of 422 of the first adhesive film 404. In some embodiments, at least one foreign material layer(s) 444 may also be used on the sides of the ply stack 410. In various embodiments, any of the one or more foreign material layer(s) 444 may be any combination of a vacuum breather, a thermal insulator, and/or a caul sheet or plate (which may have any shape). In general, a vacuum breather may be a porous material such one or more sheets of Teflon® or the like that may facilitate the evacuation of volatiles from the ply stack 410 during compaction of the ply stack. In general, caul plates or sheets of any size and/or shape, which can be stiff or semi-stiff, can be used to transmit pressure and help to provide a smooth surface for a composite component.

In some embodiments, a thermocouple or other temperature sensitive device (not shown) may be included inside the sealing bag 440 (e.g., between the foreign material layer(s) 444 and the sealing bag 440) to measure the temperature within the sealing bag 440. In some embodiments, multiple thermocouples or temperature sensing devices can be included inside the sealing bag 440 at various locations to determine temperatures at the locations. In various embodiments, the vacuum device 442 may be a vacuum pump or the like capable of providing a vacuum level within the sealing bag 440 (e.g., between 1 and 28 inches of mercury).

Figure 4C:
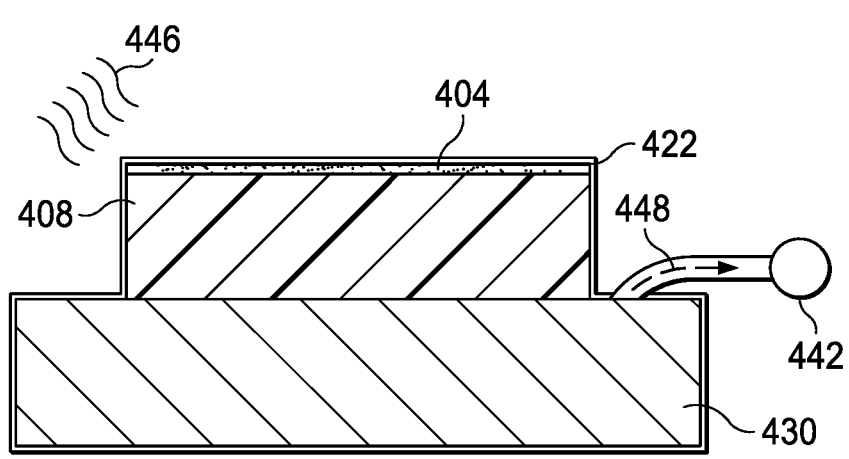

Referring to FIG. 4C, the ply stack 410 may be heated 446 (as illustrated by the squiggle lines) to an elevated temperature (or temperatures) and placed under pressure to evacuate 448 (as illustrated by the dashed-line arrow) volatiles of the plies in order to form the first composite component 408. In some embodiments, the temperature of and/or the pressure on the ply stack may be increased gradually over a period of time to reach the temperature(s) and/or pressure(s).

Figure 4D:
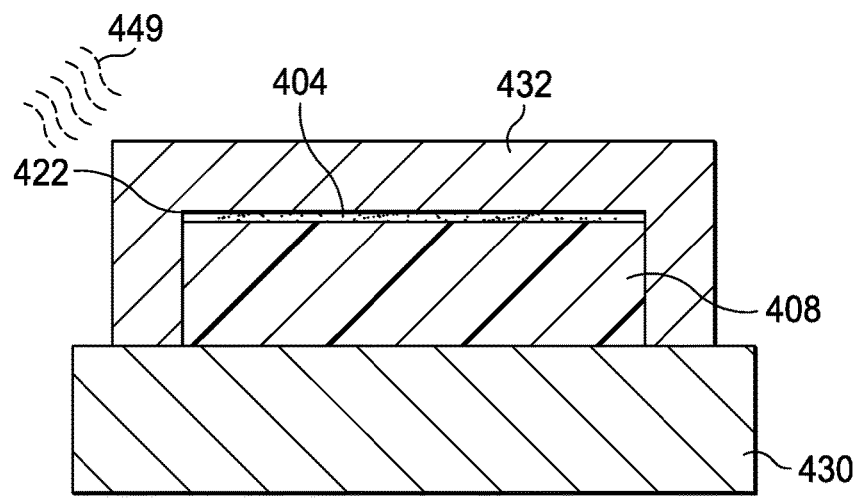

Referring to FIG. 4D, the sealing bag 440 and vacuum device 442 may be removed, and another tool 432 may be positioned along the exposed surface of the first backing film 422 of the first adhesive film 404 and along the sides of the first composite component 408. The first composite component 408 may be fully cured using a first cure cycle. For the embodiments of FIGS. 4D-4E, tool 430 may be referred to as a first tool 430 and tool 432 may be referred to as a second tool 432. In some embodiments, the first cure cycle for the first composite component 408 may include heating 449 (e.g., via an oven or autoclave) the first composite component to an elevated temperature, which may be higher or lower than the temperature(s) used during hot compaction(s), for a period of time. In some embodiments, the first composite component 408 may be cured without heating in which the embodiments, the first composite component may be fully cured after a period of time prescribed by the first cure cycle. Although the first cure cycle for the first composite component 408 may fully cure the first composite component 408, the first adhesive film 404 may be at least partially uncured or fully uncured following the first cure cycle for the first composite component 408.

Figure 4E:
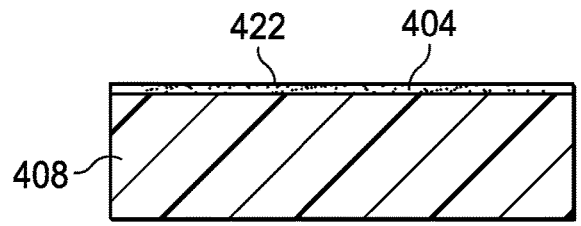

Referring to FIG. 4E, the first tool 430 and the second tool 432 may be removed following the curing. In some embodiments, the fully cured first composite component 408 may be machined (e.g., cut, drilled, etc.) before bonding the first composite component 408 to the second composite component 458.

Figure 4F:
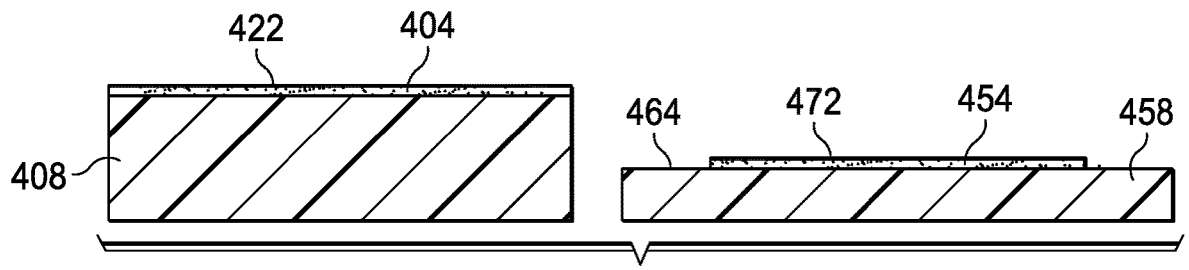

Referring to FIG. 4F, the second composite component 458 may be provided. In various embodiments, the second composite component 458 may be formed from a second composite ply stack using similar or different means or methods as the first composite component 408. The second composite component 458 includes a second adhesive film 454 applied along the intended bond line for the second composite component 458. The bond line for the second composite component may be along at least a portion of a surface 464 of the second composite component 458. The second adhesive film 454 may have a first backing film 472 covering the adhesive surface of the second adhesive film 454 that is not in contact with the surface 464 of the second composite component 458. The second backing film (not shown) of the second adhesive film 454 would have be removed from the second adhesive film 454 prior to applying the second adhesive film to the ply stack (from which the second composite component 458 was formed) in a clean room environment. The first backing film of the second adhesive film 454 may have an exposed surface (not labeled), as discussed herein.

In some embodiments, the first adhesive film 404 and the second adhesive film 454 may be made of an epoxy material such that the epoxy material may be chemically compatible with the epoxy of the composite materials used to form the first composite component 408 and the second composite component 458. In some embodiments, the epoxy material of the first adhesive film 404 and the epoxy material of the second adhesive film 454 may be different than, but still chemically compatible with, an epoxy material of at least one of the first composite component 408 and the second composite component 458. In still some embodiments, the epoxy material of the first adhesive film 404 and the epoxy material of the second adhesive film 454 may be the same as an epoxy material of at least one of the first composite component 408 and the second composite component 458.

Although epoxy materials are discussed for the present examples, BMI or the like may also be used. As referred to herein in this Specification, the phrase 'chemically compatible with' when used in reference to an adhesive film material may refer to an adhesive material that, when used in an adhesive film as discussed herein, may not cause degradation of the chemical, structural, physical, etc. properties, characteristics, features, etc. (e.g., reduced strength, reduced adhesiveness, reduced service life, etc.) of the adhesive film itself, the composite component and/or ply to which the adhesive film is affixed, and other adhesive film(s) that may be bonded to and/or otherwise affixed to the adhesive film.

For the embodiment of FIG. 4F, it is to be understood that the second composite component 458 has been fully cured using a second cure cycle, which may be the same or different than the first cure cycle of the first composite component 408. Although the second cure cycle for the second composite component 458 may fully cure the second composite component 458, the second adhesive film 454 may be at least partially uncured or fully uncured following the second cure cycle for the second composite component 458. In at least one embodiment, a first length of the first adhesive film 404 and a second length of the second adhesive film 454 may be the same.

Figure 4G:
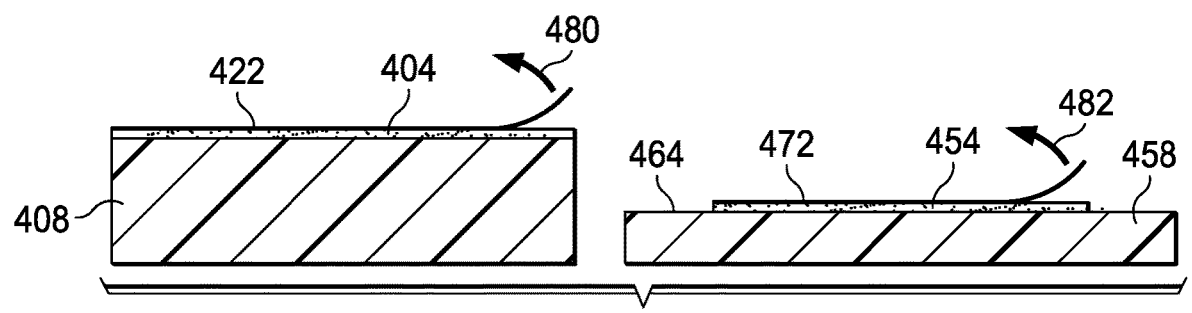

Referring to FIG. 4G, in a clean room environment, the first backing film 422 of the first adhesive film 404 is removed 480 and the first backing film 472 of the second adhesive film 454 is removed 482. In some cases, the first composite component 408 may be formed in a first cleanroom environment, the second composite component 458 may be formed in a second, different cleanroom environment, and the first and second composite components 408, 458 may be assembled and bonded together in yet a third, different cleanroom environment. The first backing film 422 of the first adhesive film 404 and the first backing film 472 of the second adhesive film 454 may protect the first and second adhesive films 404, 454, respectively, from potential contamination of the adhesive surfaces of the adhesive films 404, 454 following the respective first and second cure cycles of the respective first and second composite components 408, 458, which may, in some embodiments, advantageously provide for the ability to move the first and/or second composite components 408, 458 from one or both of their respective cleanrooms for bonding the components in yet another clean room or the same clean room in which one of the composite components was formed.

Figure 4H:
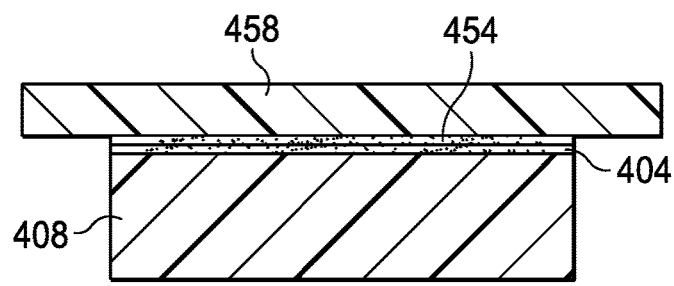

As illustrated in FIG. 4H, the first composite component 408 and the second composite component 458 can be assembled together (e.g., attached to each other) using the first and second adhesive films 404, 454. As discussed herein, in some embodiments, additional uncured adhesive films (with their backing layers removed) may be added between composite component that are to be bonded together in order to fill in gaps, variations, and/or other anomalies that may be present at the bonding surfaces of the components, since procured composite components may not conform to each other.

Figure 4I:
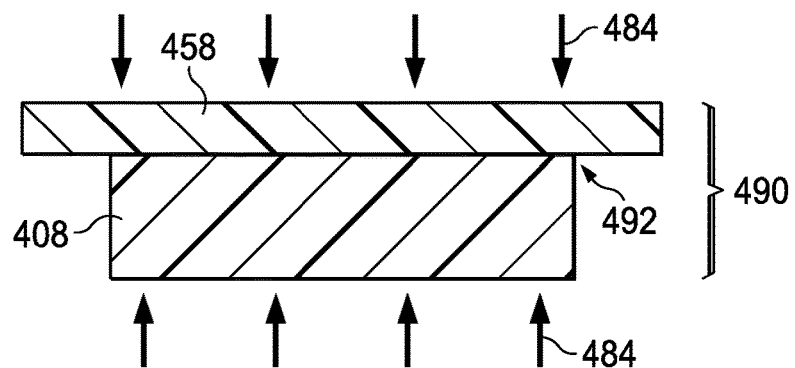

Referring to FIG. 4I, while still in the clean room environment, pressure 484 is applied (e.g., using a vacuum system, mechanical press, etc.) and a third cure cycle (e.g., using heat, a period of time, UV light, or combinations thereof) is performed to cure the first adhesive film 404 and the second adhesive film 454, effectively creating a 'cocured' bond between the first composite component 408 and the second composite component 458 to form a bonded structure 490 having a certifiable bond joint 492 (e.g., the bond joint can be certified assuming the components were bonded together using a bonding process that has been previously certified). The third cure cycle is different than the first cure cycle used for the first composite component 408 and the second cure cycle used for the second composite component 458. In some embodiments, an additional cure cycle may be used to complete the bond between the first composite component 408 and the second composite component. Accordingly, adhesive film materials as discussed for various embodiments described herein can allow composite parts to be fully cured prior to bonding but still retain the 'cocured' behavior enabling certifiable bonded joints.

Although the embodiments of FIGS. 4A-4I illustrate bonding a first composite component (e.g., first composite component 408) and a second composite component (e.g., second composite component 458) together, it is to be understood that bonding using adhesive films as discussed for various embodiments described herein is not limited to bonding only two components together. For example, in some embodiments, one or more first composite components and/or one or more second composite components may be bonded together using adhesive films.

Figure 5A:
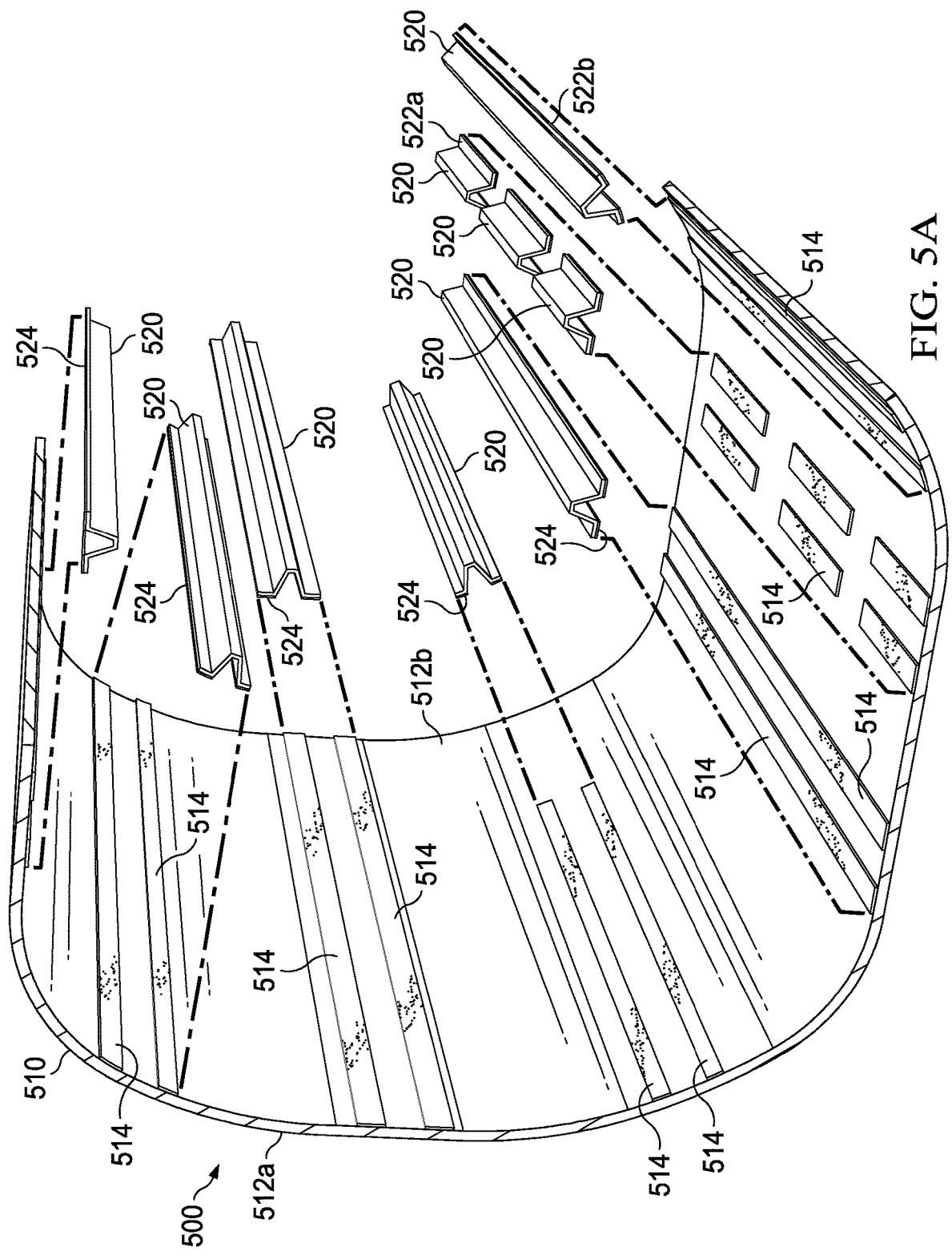
FIGS. 5A-5B are simplified isometric view diagrams illustrating other example details that may be associated with forming a bonded structure, in accordance with certain embodiments.
Figure 5B:
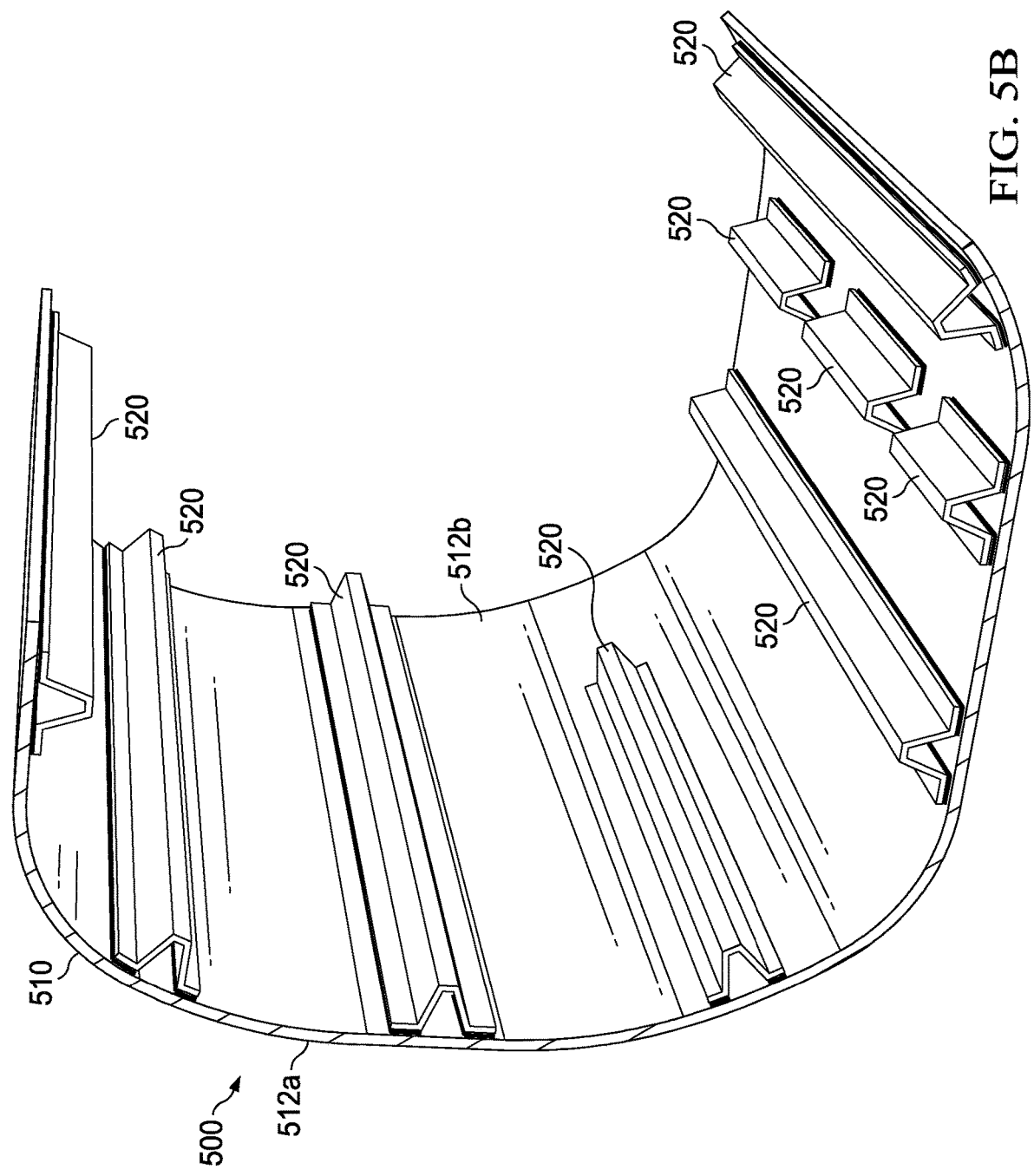

Referring to FIGS. 5A-5B, FIGS. 5A-5B are simplified isometric view diagrams illustrating example details associated with forming a bonded structure 500, in accordance with certain embodiments. As illustrated in FIG. 5A, a first composite component 510 and multiple second composite components 520 may be provided. The first composite component may be a cowling, fairing, or skin for a rotorcraft (e.g., rotorcraft 100) and the second composite components 520 may be stringers that may improve structural rigidity for the cowling, fairing, or skin. The first composite component 510 may have a first (outer) surface 512a and second (inner) surface 512b. Each of the second composite components 520 may have a first (outer) surface 522a and a second (inner) surface 522b. The first composite component 510 may include multiple first adhesive films 514 applied to the second surface 512b of the first component at bond locations (e.g., bond lines) that align with each of the second surfaces 522b of each of the second composite components 520 for bonding the components together along the bond lines. Each second composite component 520 may include second adhesive films 524 applied to their second surfaces 522b.

For the purposes of the embodiment of FIG. 5A, it is to be understood that the first and second composite components 510, 520 are in a clean room environment and that backing films have been removed from the first and second adhesive films 514, 524 for all the components prior to bonding the components together.

As illustrated in FIG. 5B, the first and second composite components 510, 520 may be bonded together (under pressure) using, at least in part, a cure cycle that cures the first and second adhesive films 514, 524 to form the bonded structure 500 in which the bond joints between the first composite component 510 and each of the second composite components 520 can be certified (e.g., the bond joints can be certified assuming the components were bonded together using a bonding process that has been previously certified).

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    assembling a first ply stack, wherein the first ply stack comprises a plurality of uncured first plies and a first adhesive film, and the first adhesive film comprises a backing film on one surface, the first adhesive film disposed along an intended bond line;
    applying pressure and heat to the first ply stack to debulk and compact the first ply stack to form a first component using a vacuum system including a sealing bag and at least one foreign material disposed between the sealing bag and the backing film of the first adhesive film;
    curing the first component with a first cure cycle;
    assembling a second ply stack, wherein the second ply stack comprises a plurality of second plies and a second adhesive film, and the second adhesive film comprises a backing film on one surface;
    applying pressure and heat to the second ply stack to debulk and compact the second ply stack to form a second component;
    curing the second component with a second cure cycle;
    removing the backing film of the first adhesive film and the backing film of the second adhesive film;
    assembling the first component and the second component using, at least in part, the exposed first adhesive film and the exposed second adhesive film; and
    curing the first adhesive film and the second adhesive film using a third cure cycle to form a bonded structure;
    wherein the backing film of the first adhesive film comprises at least one of wax coated paper, polyester film, nylon, polyvinyl fluoride, and polytetrafluoroethylene.

2. The method of claim 1, wherein the first adhesive film and the second adhesive film are composed of an epoxy material.

3. The method of claim 2, wherein the epoxy material of the first adhesive film and the second adhesive film is different than an epoxy material of at least one of the first component and the second component.

4. The method of claim 2, wherein the epoxy material of the first adhesive film and the second adhesive film is the same as an epoxy material of at least one of the first component and the second component.

5. The method of claim 1, further comprising:
    prior to the assembling, providing at least one other adhesive film between the first adhesive film of the first component and the second adhesive film of the second component.

6. The method of claim 1, wherein the third cure cycle comprises at least one of:
    a temperature that is higher than a first temperature used in the first cure cycle and a second temperature used in the second cure cycle;
    a period of time that is longer than a first period of time used in the first cure cycle and a second period of time used in the second cure cycle; and an ultraviolet light applied to the assembled first and second components.

7. The method of claim 1, wherein the third cure cycle includes applying a pressure to the assembled first and second components.

8. The method of claim 1, wherein the method is performed in a clean room environment.

9. A method comprising:
assembling a first ply stack, wherein the first ply stack comprises a plurality of first uncured plies and a first adhesive film, and the first adhesive film comprises a backing film on one surface, the first adhesive film disposed along an intended bond line;
applying pressure and heat to the first ply stack to debulk and compact the first ply stack to form a first composite component, using a vacuum system including a sealing bag and at least one foreign material layer placed between the sealing bag and the backing film of the first adhesive film;
curing the first composite component using a first cure cycle;
assembling a second ply stack, wherein the second ply stack comprises a plurality of second plies and a second adhesive film, and the second adhesive film comprises a backing film on one surface;
applying pressure and heat to the second ply stack to debulk and compact the ply stack in order to form a second composite component;
curing the second composite component using a second cure cycle; removing the backing film of the first adhesive film and the backing film of the second adhesive film;
assembling the first composite component and the second composite component using, at least in part, the first adhesive film and the second adhesive film; and
curing the first adhesive film and the second adhesive film using a third cure cycle to form a bonded structure;
wherein the backing film of the first adhesive film comprises at least one of wax coated paper, polyester film, nylon, polyvinyl fluoride, and polytetrafluoroethylene.

10. The method of claim 9, further comprising:
prior to the assembling, providing at least one other adhesive film between the first adhesive film of the first composite component and the second adhesive film of the second composite component.

11. The method of claim 9, wherein the third cure cycle comprises at least one of a temperature that is higher than a first temperature used in the first cure cycle and a second temperature used in the second cure cycle, a period of time that is longer than a first period of time used in the first cure cycle and a second period of time used in the second cure cycle, and an ultraviolet light applied to the assembled first and second components.

12. The method of claim 9, wherein the third cure cycle includes applying a pressure to the assembled first and second composite components.

13. The method of claim 9, wherein the method is performed in a clean room environment.

14. The method of claim 9, wherein the first adhesive film and the second adhesive film comprise at least one of epoxy and bismaleimide.

15. The method of claim 9, wherein the first adhesive film and the second adhesive film comprise an epoxy material that is different than an epoxy material of at least one of the first composite component and the second composite component.

16. The method of claim 9, wherein the first adhesive film and the second adhesive film comprise an epoxy material that is the same as an epoxy material of at least one of the first composite component and the second composite component.

17. The method of claim 9, wherein at least one of:
the first composite component is at least one of a plurality of first components; and
the second composite component is at least one of a plurality of second components.

* * * * *